US009870138B2

(12) United States Patent
Mutyala et al.

(10) Patent No.: US 9,870,138 B2
(45) Date of Patent: Jan. 16, 2018

(54) METHOD FOR DISPLAYING CONTENT AND ELECTRONIC DEVICE THEREOF

(71) Applicant: Samsung Electronics Co., Ltd., Suwon-si, Gyeonggi-do (KR)

(72) Inventors: Krishnamraju Murali Venkata Mutyala, Bangalore (IN); Prakhyath Kumar Hegde, Bangalore (IN); Rames Palanisamy, Bangalore (IN); Gandhi Gurunathan Rajendran, Bangalore (IN); Srinidhi Nirgunda Seshadri, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 714 days.

(21) Appl. No.: 14/444,148

(22) Filed: Jul. 28, 2014

(65) Prior Publication Data

US 2015/0067548 A1    Mar. 5, 2015

(30) Foreign Application Priority Data

Sep. 4, 2013    (IN) ............................ 3956/CHE/2013

(51) Int. Cl.
*G06F 3/0488* (2013.01)
*H04W 12/00* (2009.01)
*G06F 3/14* (2006.01)
*G06F 3/0482* (2013.01)

(52) U.S. Cl.
CPC .......... *G06F 3/0488* (2013.01); *G06F 3/0482* (2013.01); *G06F 3/1423* (2013.01); *H04W 12/00* (2013.01)

(58) Field of Classification Search
None
See application file for complete search history.

(56) References Cited

U.S. PATENT DOCUMENTS

| | | | |
|---|---|---|---|
| 7,366,498 B2* | 4/2008 | Ko | H04L 12/2803 455/411 |
| 9,003,185 B2* | 4/2015 | Chang | G06F 1/3287 713/166 |
| 9,223,956 B2* | 12/2015 | Hong | G06F 21/32 |
| 2005/0091332 A1* | 4/2005 | Moro | H04L 67/125 709/208 |

(Continued)

FOREIGN PATENT DOCUMENTS

| | | |
|---|---|---|
| WO | 2011/099712 A2 | 8/2011 |
| WO | 2013/007573 A1 | 1/2013 |

*Primary Examiner* — Christopher Revak
(74) *Attorney, Agent, or Firm* — Jefferson IP Law LLP

(57) ABSTRACT

A method and system for extending display content across multiple display devices over a network using fingerprint of a user by registering fingerprints of the user in a master device and allowing the user to perform an action on the master device is provided. The method includes broadcasting, by the master device, a first key to one or more slave devices after authorizing the user and generating the first key based on a polarity of a hand performing the user action on the master device and considering a relative location of the slave device, and extending, by the master device, the display content to one or more identified slave devices within the network after establishing a connection between the master device and one or more slave devices.

20 Claims, 8 Drawing Sheets

(56) References Cited

U.S. PATENT DOCUMENTS

| | | | |
|---|---|---|---|
| 2006/0050669 A1* | 3/2006 | Kaikuranta | H04W 4/008 370/338 |
| 2006/0094402 A1* | 5/2006 | Kim | H04M 1/7253 455/411 |
| 2006/0135064 A1* | 6/2006 | Cho | H04M 1/7253 455/41.1 |
| 2006/0148402 A1* | 7/2006 | Hagiwara | H04L 9/3271 455/41.1 |
| 2009/0249478 A1* | 10/2009 | Rosener | G06F 21/31 726/19 |
| 2010/0100735 A1* | 4/2010 | Rajan | H04L 63/0823 713/168 |
| 2010/0151790 A1* | 6/2010 | Hoeksel | G06K 7/0008 455/41.2 |
| 2010/0225443 A1* | 9/2010 | Bayram | G06F 21/316 340/5.83 |
| 2011/0055546 A1* | 3/2011 | Klassen | G06F 21/305 713/150 |
| 2011/0307945 A1* | 12/2011 | Huang | G06F 21/35 726/6 |
| 2012/0040617 A1* | 2/2012 | Hsia | H04L 63/0869 455/41.3 |
| 2012/0062442 A1 | 3/2012 | Locker et al. | |
| 2012/0117290 A1* | 5/2012 | Sirpal | G06F 1/1632 710/303 |
| 2013/0152342 A1 | 6/2013 | Ahn et al. | |
| 2014/0082117 A1* | 3/2014 | Unhale | H04L 67/306 709/208 |
| 2015/0139044 A1* | 5/2015 | Maski | H04W 76/025 370/261 |
| 2016/0093166 A1* | 3/2016 | Panambur | G07F 17/3251 463/25 |

* cited by examiner

METHOD FOR DISPLAYING CONTENT AND ELECTRONIC DEVICE THEREOF

CROSS-REFERENCE TO RELATED APPLICATION(S)

This application claims the benefit under 35 U.S.C. §119 (a) of an Indian patent application filed on Sep. 4, 2013 in the Intellectual Property of India and assigned Ser. No. 3956/CHE/2013, and of an Indian patent application filed on Oct. 23, 2013 in the Intellectual Property of India and assigned Ser. No. 3956/CHE/2013, the entire disclosure of each of which is hereby incorporated by reference.

TECHNICAL FIELD

The present disclosure relates to enhancing user experience. More particularly, the present disclosure relates to extending display content across multiple display devices over a network using a fingerprint of a user.

BACKGROUND

Existing display devices generally support a smaller display area. Viewing and managing the content on such smaller display areas hampers users experiences. Various solutions have been suggested to improve the user experience while viewing the content on smaller display areas.

In a method, multiple display units are supported for a mobile terminal and a controller unit is provided to select the display units for presenting the content in a way to improve the user experience. Further, the method enables dynamic content presentation by resizing the display area previewed by the user. As a result, the solution requires additional hardware and software modules to extend the content on multiple display units.

In another method, multiple display units are connected by using gear hinges. Rotating the gear hinges on a hinge axis enables the user to connect the display units and align the display units along the hinge axis to extend the display content. Thus, the solution requires a gear hinge to support content extension on multiple display units.

In another method, a display orientation module is implemented in every display unit supported for the mobile terminal. Further, the module determines the orientation of the display units to extend the content on the display units. This solution requires additional modules to enable alignment of multiple display units for the mobile terminal.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method displaying content and electronic device thereof.

An aspect of the present disclosure herein is to provide a method to extend display content across multiple display devices over a network using a fingerprint of a user, and identify relative position of the display devices.

Another aspect of the present disclosure is to provide the method to register fingerprints of the user in a master device and allow the user to perform at least one action on the master device.

Another aspect of the present disclosure is to provide the method to broadcast a first key to a slave device by the master device after authorizing the user.

In accordance with an aspect of the present disclosure, a method for extending display content across a plurality of display devices is provided. The method includes performing a user action using a finger on a master device, identifying at least one slave device based on the user action performed on the master device, and extending the display content from the master device to the identified at least one slave device.

In accordance with another aspect of the present disclosure, an electronic device for extending display content with at least one slave device is provided. The electronic device includes an integrated circuit including at least one processor and at least one memory having a computer program code stored therein. The at least one memory and the computer program code with at least one processor cause the electronic device to perform the user action using the finger on the electronic device, identify at least one slave device based on the user action performed on the electronic device, and extend the display content from the electronic device to the identified at least one slave device.

In accordance with another aspect of the present disclosure, a slave device to extend display content received from a master device is provided. The slave device includes an integrated circuit including at least one processor and at least one memory having a computer program code stored therein. The at least one memory and the computer program code with at least one processor cause the slave device to receive a broadcasted first key from the master device, send a response to the master device, wherein the response is sent by matching the broadcasted first key with a second key generated on the slave device, and extend the display content after receiving connection request from the master device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
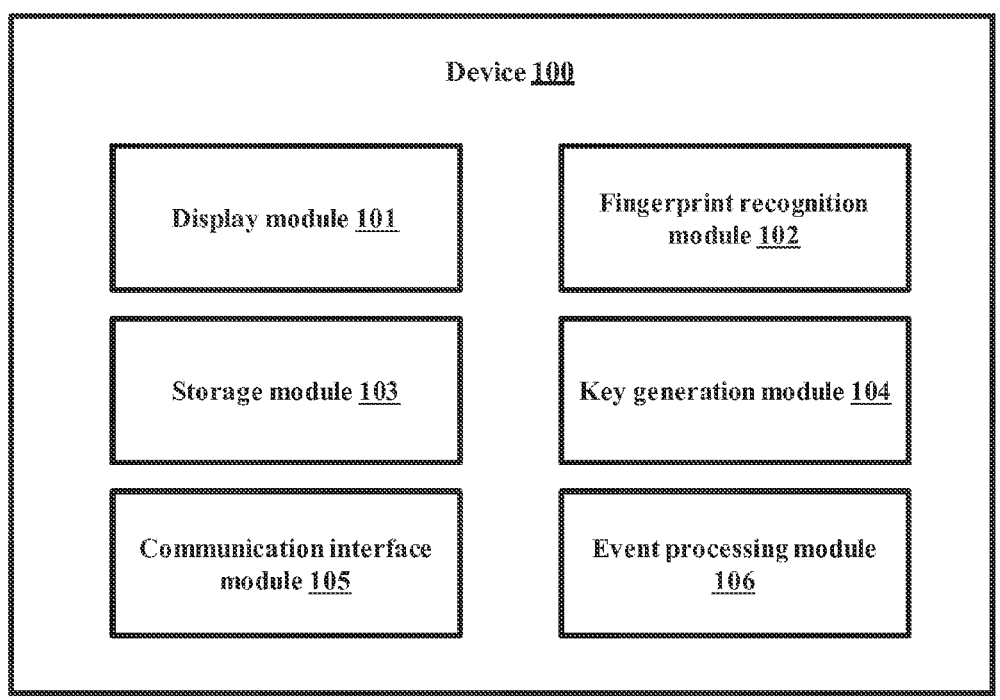
FIG. 1 illustrates a device comprising various modules to extend the display content across multiple display devices over a network according to an embodiment of the present disclosure.

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The various embodiments herein achieve a method and system to extend display content across multiple display devices over a network using a fingerprint of a user on a device. The method extends the display content by broadcasting a generated first key from a master device. The first key is generated on the master device when an authorized user performs an action on a fingerprint recognition module on the master device. The generated first key considers the user's finger which in turn determines polarity of a hand performing the user action on the master device and a relative location of one or more slave devices. Further, the method allows the master device to identify the slave device by generating a second key on the slave device, which considers the polarity of the hand performing the user action on the fingerprint recognition module on the slave device. The method allows the master device to establish a connection with the slave device that sends a response by matching the first key generated on the master device and the second key generated on the slave device. After establishing a connection between the master device and one or more slave devices, the display content is extended from the master device to one or more slave devices.

The user action can be a swipe, a tap, a touch on a touch screen, a drag, or the like performed on the fingerprint recognition module.

The device includes but is not limited to a mobile phone, a laptop, a tablet, a personal computer, a digital media player, an electronic watch, or any other electronic device with the fingerprint recognition module that is capable of identifying an action performed by the user, generating a key based on the recognized action, and establishing a connection with other devices in the network.

The master device may be a device that registers and stores fingerprints of the user who owns the device and initiates the display content in order to extend from the master device to the connected one or more slave devices. The master device may support the fingerprint recognition module that is capable of identifying and authorizing the action performed by the user on the master device, and generating the first key on the master device based on the polarity of the hand performing the user action on the master device and considering a relative location of one or more slave devices.

The slave device may be a device that is capable of receiving the first key broadcasted by the master device and generating the second key based on the polarity of the hand performing the user action on the slave device. The slave device may determine whether the first key received from the master device matches the second key generated on the slave device.

The relative location of the slave device may be the positioning of the slave device with respect to the polarity of the hand performing the user action on the master device in the network. For example, the relative location of the slave device is towards the right-side of the master device if the polarity of the hand performing the user action on the master device is determined to be a left-hand finger of the user.

The device considered as the master device can be considered as the slave device.

Authorization of the user confirms that the user has already registered and stored his/her fingerprints in the master device for generating the first key on the master device.

Throughout the description, the master device and the slave device is referred to as a paired device while the master device is connected to the slave device.

The network can be a Local Area Network (LAN), a wireless network such as a Wi-Fi network, Bluetooth network and the like.

For example, a laptop device considered as the master device can be paired with another laptop device considered as the slave device. A mobile phone considered as the master device can be paired with another mobile phone considered as the slave device. Also, a mobile phone considered as the master device can be paired with a tablet or a laptop device.

The term content includes but not limited to a text file, a multimedia file, an application, a web page, an event, and any other content displayed in the screen of the master device. The event generated on the slave device after performing an action by the user on an application is communicated to the master device for further processing.

FIG. 1 illustrates a device comprising various modules according to an embodiment of the present disclosure.

Referring to FIG. 1, a device 100 includes a display module 101, a fingerprint recognition module 102, a storage module 103, a key generation module 104, a communication interface module 105, and an event processing module 106.

The display module 101 displays the content on the device 100. The display module 101 allows the user to provide fingerprints of the user as inputs for registering the user fingerprints on the device 100. The device 100 can support the display module 101 in different forms such as a Graphical User Interface (GUI), a browser, a touch screen interface and the like. As the user provides fingerprints as input to the display module 101, the fingerprint recognition module 102 recognizes the fingerprint of the user and stores the fingerprint of the user using the storage module 103.

The Display module 101 may be implemented on both the master device and the slave device within the same network.

The storage module 103 stores the registered fingerprints of the user that includes but not limited to a memory device, a hard disk, a Random Access Memory (RAM), a Read Only Memory (ROM) and the like.

The storage module 103 may be implemented only on the master device in the network.

The key generation module 104 generates the first key on the master device and the second key on the slave device based on the polarity of the hand performing the user action on the device 100 as recognized by the fingerprint recognition module 102. Further, while generating the first key on the master device the fingerprint recognition module 102 considers the polarity of the hand performing the user action on the master device and the relative location of the slave device to extend the content.

The fingerprint recognition module 102 may recognize the fingerprint of the user when the user places his/her finger over the fingerprint recognition module 102.

The key generation module 104 may be implemented on both the master device and the slave device within the network.

The key generation module 104 implemented on the slave device may determine whether the first key generated on the master device matches the second key generated on the slave device to establish a connection between the master device and the slave device.

The communication interface module 105 establishes a connection between the master device and the slave device for extending the display content from the master device to the slave device. The communication interface module 105 establishes a connection between the master device and one or more slave devices.

The communication interface module 105 may be implemented in both the master device and the slave device in the network.

The event processing module 106 on the master device processes the events that are communicated from the slave device in the network. The event initiated from the extended display content on the slave device is transmitted to the master device using the communication interface module 105 for processing the event on the master device. Further, the processed event result occurs on the master device.

For example, a browser application is initiated from the master device and extends the application content to the slave device. When the user types a browser address and press an ENTER button on the slave device, the master device loads the browser address and displays the browser page.

The event processing module 106 may be implemented on the master device within the network.

Figure 2:
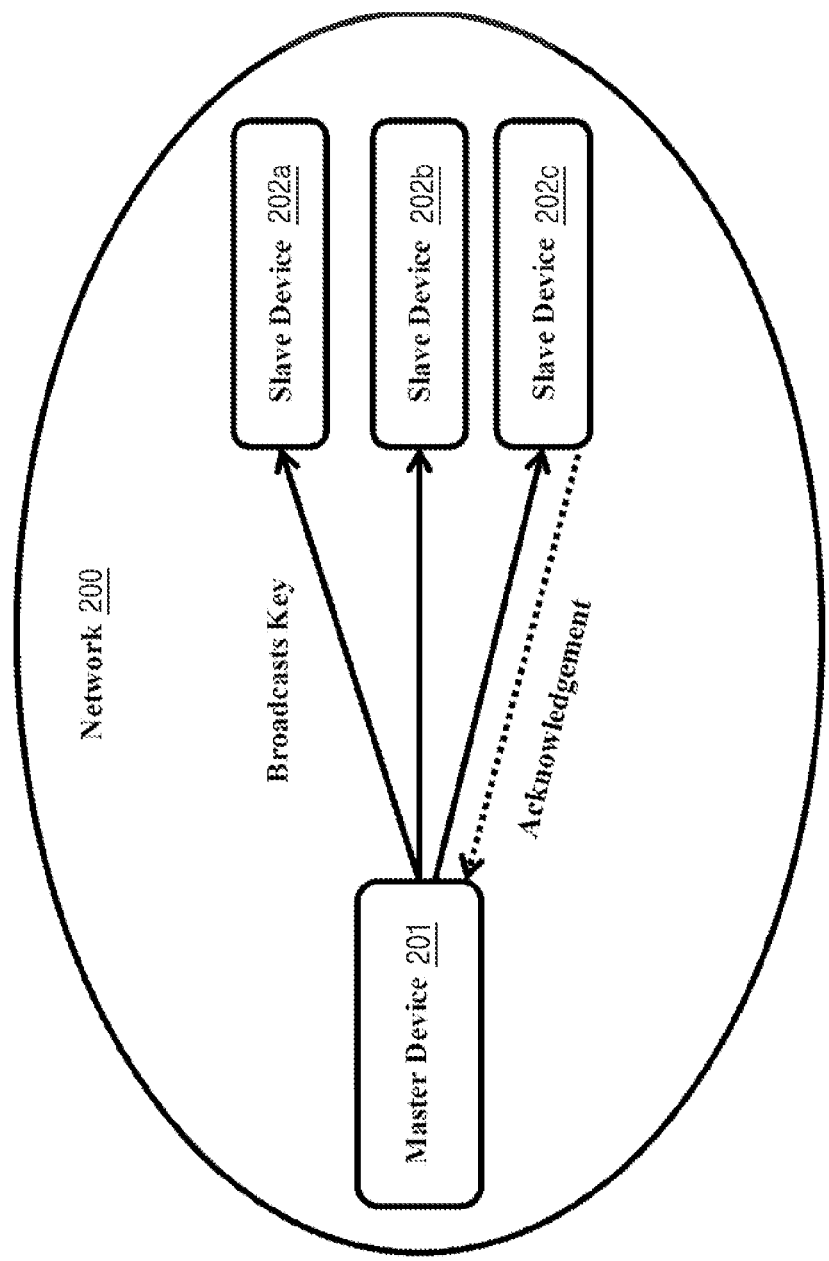
FIG. 2 illustrates a method to broadcast a request to establish a connection between a master device and a slave device in the network according to an embodiment of the present disclosure.

FIG. 2 illustrates a method to broadcast a request to establish a connection between devices in a network according to an embodiment of the present disclosure.

Referring to FIG. 2, after the master device 201 completes the user fingerprint registration and authorizes the user action on the master device 201, the master device 201 broadcasts with the first key to all the slave devices 202a, 202b, 202c within the network 200. All of the slave devices 202a, 202b, 202c within the network 200 receive the broadcasted request. As the user performs the action on the fingerprint recognition module on each of the slave devices, the second key is generated on the slave devices 202a, 202b, 202c considering the polarity of the hand performing the user action on the slave device within the network 200. However, only the slave device 202c that generates a matching key for the first key sends the response (acknowledgement) to the master device 201 for establishing a connection with the master key.

A connection is established between the master device and one or more slave devices that sends acknowledgement.

Figure 3:
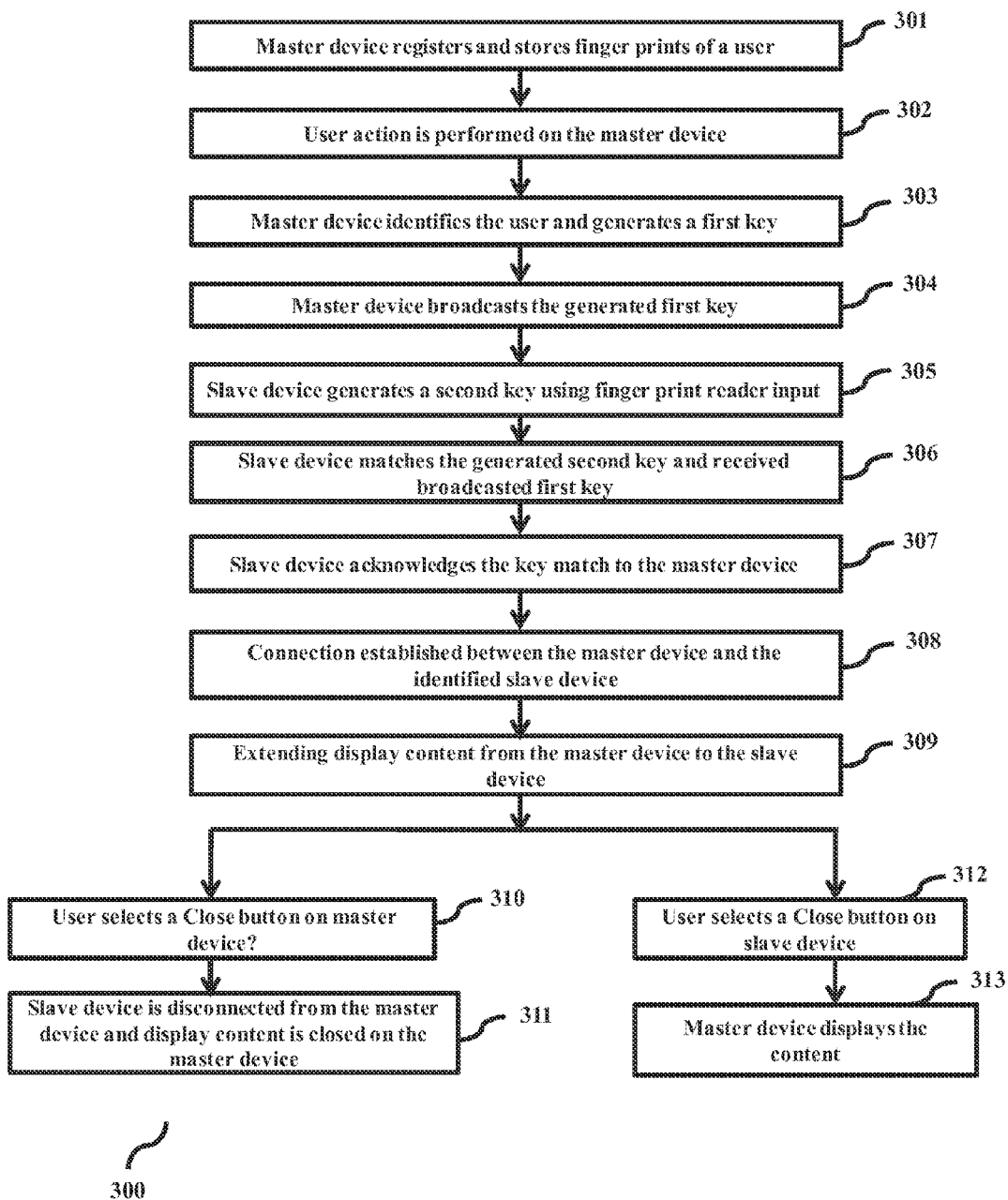
FIG. 3 illustrates a flow diagram explaining a process of extending the display content across multiple display devices over a network according to an embodiment of the present disclosure.

FIG. 3 illustrates a flow diagram explaining a process of extending display content across multiple display devices over a network, according to an embodiment of the present disclosure.

Referring to FIG. 3, initially the user who owns the device registers in operation 301 his/her fingerprints and stores the fingerprints in the master device 201 in the network 200. When the user performs in operation 302 the action on the fingerprint recognition module 102 of the master device 201, the method authorizes the user and generates in operation 303 the first key based on the action performed by the user by considering the polarity of the hand performing the action on the master device 201 and the relative location of the slave device within the network 200. The master device 201 is configured to broadcast in operation 304 the first key to all the slave devices within the network 200. As the user performs the action on the fingerprint recognition module 102 of the slave device within the network 200, one or more slave devices generate in operation 305 the second key based on the polarity of the hand performing the user action in the finger print reader input on the slave device. The slave device determines in operation 306 whether the second key matches the first key. If the first key and the second key match then the slave device 202c sends in operation 307 the acknowledgement to the master device 201 as the identified slave device 202c for establishing in operation 308 a connection between the master device 201 and the identified slave device 202c. A connection is established between the master device 201 and the identified slave device 202c. After establishing a connection, in operation 309 the display content is extended between the master device 201 and the slave device 202c. While viewing the extended display content, the user may disconnect the connected devices by either performing a close operation on the master device 201 or on the slave device 202c.

When the user selects the close operation in operation 310, on the master device 201, the master device 210 disconnects in operation 311 the slave device 202c and closes the display content on the master device 201.

When the user selects the close operation in operation 312 on one or more slave devices, the one or more slave devices disconnect from the master device 201, and the extended display content is viewed in operation 313 on the master device 201 and the remaining connected slave devices. The extended display content is equally divided between the master device 201 and the remaining connected slave devices.

For example, if the display content is extended between the master device and the two slave devices 202a, 202b and the user performs a close operation on the slave device 202b, then the display content is extended between the master device and the connected slave device 202a.

In another example, if the user performs a close operation on the master device, which is connected to the slave device 202a, then the extended display content on the master device is closed and the slave device 202a gets disconnected from the master device. The various actions in as depicted in FIG. 3 may be performed in the order presented, in a different order or simultaneously. Further, in some embodiments, some actions listed in FIG. 3 may be omitted.

Figure 4:
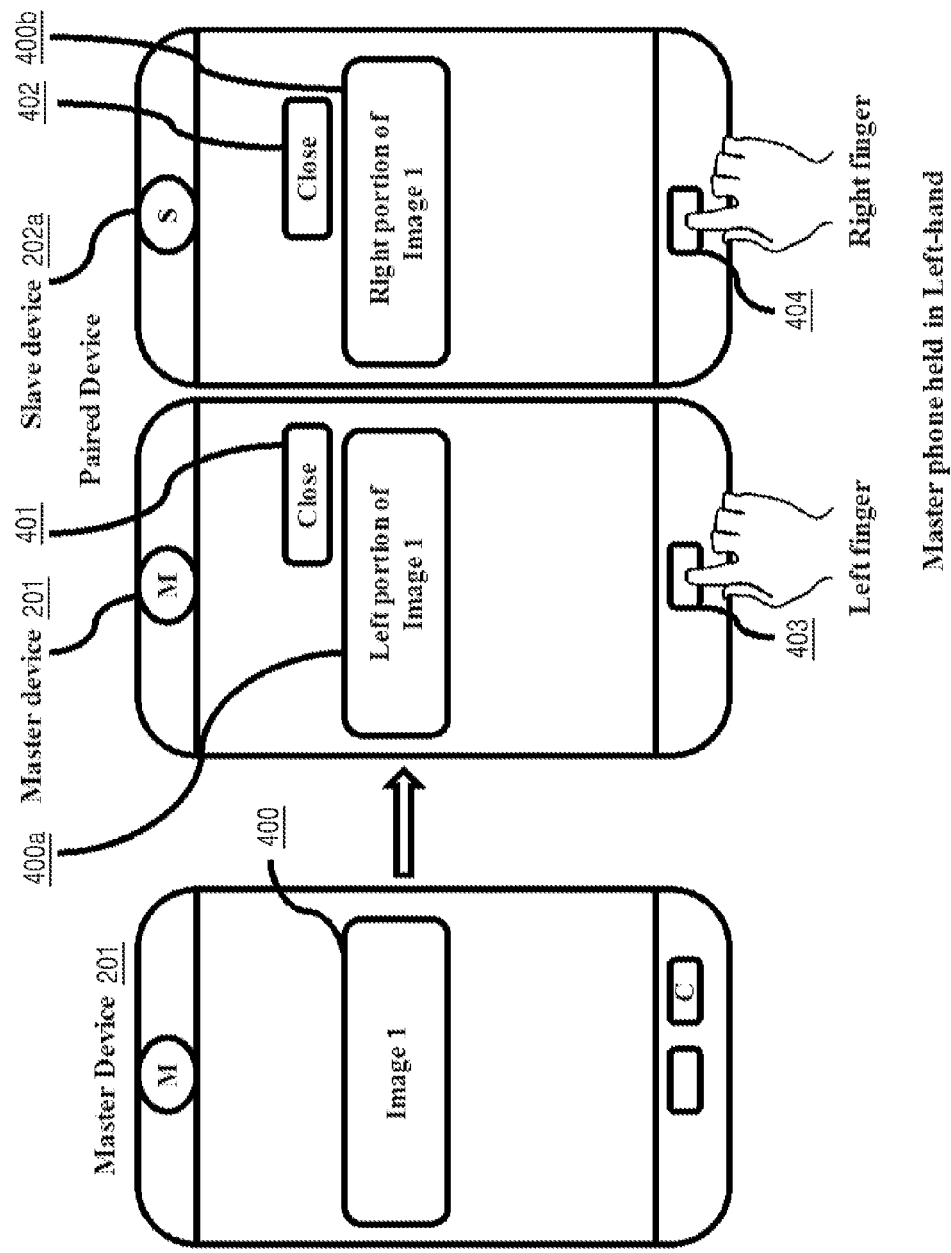
FIG. 4 illustrates an example method to extend display content from a master device to a slave device based on a polarity of a hand performing the user action on the master device and considering a relative location of the slave device according to an embodiment of the present disclosure.

FIG. 4 illustrates an example method to extend display content from a master device to a slave device based on a polarity of a hand performing the user action on the master device and considering a relative location of the slave device according to an embodiment of the present disclosure.

Referring to FIG. 4, initially the user views the display content 400 only on the master device 201. The display content may be an image. The method allows the user to register and store the fingerprints of the user on the master device 201. The master device 201 establishes a connection with the slave device 202a, positioned towards the right-side of the master device 201, to extend the display content from the master device 201 to the slave device 202a. For example, as depicted in FIG. 4, the user performs the action on a smart phone using his/her left-hand finger and this phone is considered as the master device 201 as the fingerprints of the user are registered in the device 201 and the display content is extended from the device 201. When the user performs a left-finger swipe action 403 on the fingerprint recognition module 102 of the master device 201, the device authorizes the user and generates the first key to establish a connection with the slave device 202a that is located towards the right-side of the master device 201. The slave device 202a identifies itself to be connected with the master device 201 after generating the second key on the slave device 202a and matching the second key with the first key on the slave device 202a. The second key is generated on the slave device 202a by performing a right-finger swipe action 404 on the slave device 202a. Further, the method extends the content 400 from the master device 201 (displaying the left portion 400a of the content) to the slave device 202a (displaying the right portion 400b of the content). The method allows the user to disconnect the master device 201 and the slave device 202a by selecting the close button on either the master device (close button 401) or on the slave device (close button 402). When the slave device 202a is disconnected from the master device 201, the display content is displayed only on the master device 201.

Figure 5:
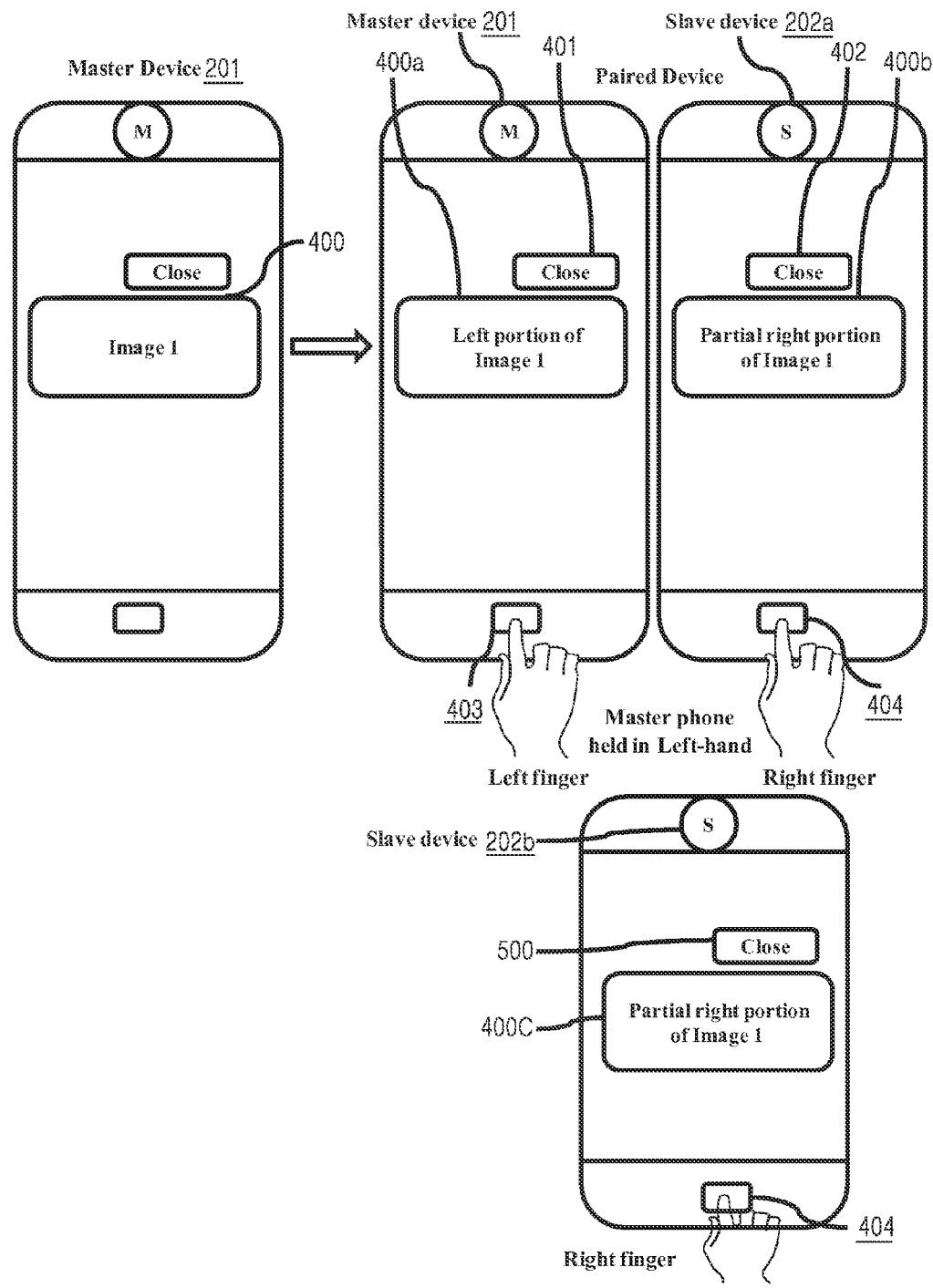
FIG. 5 illustrates an example method to extend display content from a master device to one or more slave devices over the network according to an embodiment of the present disclosure.

FIG. 5 illustrates an example method to extend display content from a master device to one or more slave devices in a network according to an embodiment of the present disclosure.

Referring to FIG. 5, the user initially views the display content 400 only on the master device 201. The method allows the user to register and store the fingerprints of the user on the master device 201. The method allows the master device 201 to identify the relative location of both the slave devices 202a and 202b, which is towards the right-side of the master device 201. The relative location of the slave devices 202a, 202b are determined by the master device 201 by checking the polarity of the hand that performs the user action on the master device 201. The method establishes a connection between the master device 201 and the two slave devices 202a, 202b and extends the display content from the master device 201 to the slave devices 202a, 202b. For example, as depicted in FIG. 5, the user performs a left-finger swipe action 403 on the fingerprint recognition module 102 of the master device 201. When the user performs the action on the master device 201, the method allows the master device 201 to authorize the user and generates the first key to establish a connection with the slave devices 202a, 202b that are located towards the right-side of the master device 201. The slave devices 202a, 202b identify themselves to be connected with the master device 201 after generating the second key on each of the slave devices 202a, 202b, by performing a right-finger swipe action 404 on the slave device 202a and matching the second keys with the first key. The method extends the display content 400 from the master device 201 which displays the left portion of the content 400a and equally shares the right portion of the content 400 with the slave devices 202a, 202b. Each of the slave devices 202a, 202b display partial right portion 400b, 400c of the content 400. Further, the method allows the user to disconnect the master device 201 and the slave devices 202a, 202b by selecting the close button 401, 402, 500 on either the master device 201 or on one of the slave devices 202a, 202b. When the slave devices are disconnected the display content gets extended from the master device 201 to the remaining connected slave device.

Figure 6:
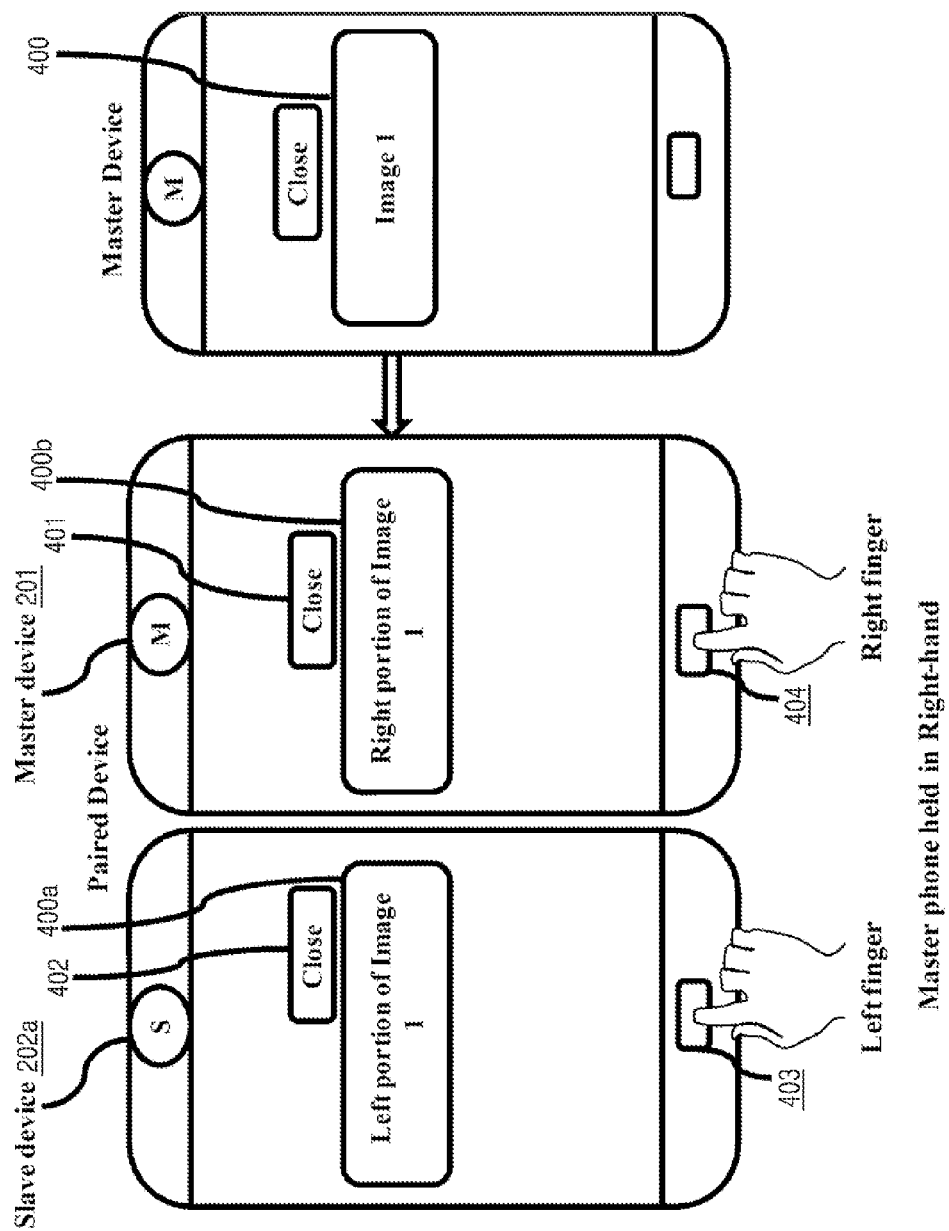
FIG. 6 illustrates an example method to extend display content from a master device to a slave device based on a polarity of a hand performing the user action on the master device and considering a relative location of the slave device according to an embodiment of the present disclosure.

FIG. 6 illustrates an example method to extend display content from a master device to a slave device based on a polarity of a hand performing the user action on the master device and considering a relative location of the slave device according to an embodiment of the present disclosure.

Referring to FIG. 6, initially the user views the display content 400 only on the master device 201. The method allows the user to register the fingerprints of the user on the master device 201. The method establishes a connection with the slave device 202a to extend the display content from the master device 201 to the slave device 202a, positioned towards the left-side of the master device 201. For example, as depicted in FIG. 6, the user performs a right-finger swipe action 404 on the fingerprint recognition module 102 of the master device 201, and the method allows the master device 201 to authorize the user and generate the first key to establish a connection with the slave device 202a that is located towards the left-side of the master device 201. The slave device 202a identifies itself to be connected with the master device 201 after generating the second key on the slave device 202a and matching the second key with the first key. The method allows the slave device 202a to generate the second key by performing a left-finger swipe action 403 on the slave device 202a. After establishing a connection between the master device 201 and the slave device 202a, the method extends the display content from the master device 201 (displaying the right portion of the content 400b) to the slave device 202a (displaying the left portion of the content 400a). The method allows the user to disconnect the master device 201 and the slave device 202a by selecting the close button on either the master device (close button 401) or on the slave device (close button 402). When the connected slave device 202a is disconnected, the content is displayed only on the master device 201.

Figure 7:
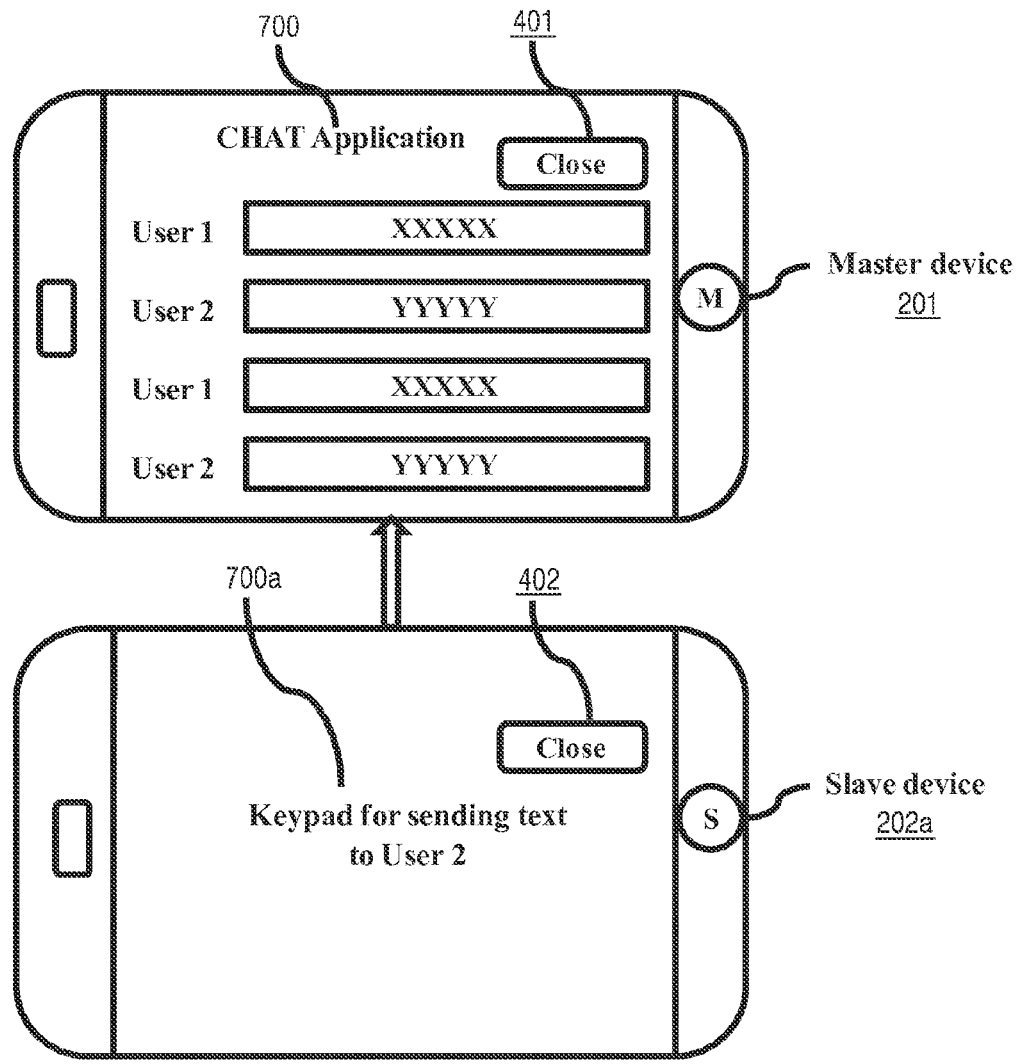
FIG. 7 illustrates an example method to extend an application from a master device to a slave device and handling an event occurring on the slave device according to an embodiment of the present disclosure.

FIG. 7 illustrates an example method to extend an application from a master device to a slave device and handling an event occurring on the slave device according to an embodiment of the present disclosure.

Referring to FIG. 7, the display content is extended from the master device 201 to the slave device 202a. The display content extended to the slave device 202a contains the extended portion of the content. The extended portion of the content on the slave device 202a allows the user to perform certain actions on the slave device 202a. These actions performed on the slave device 202a intended for the content displayed in the master device 201 is referred to as an event. Upon receiving the event from the slave device 202a, the method allows the master device 201 to process the events. The event processed results can be seen on the master device 201. For example, the master device 201 displays a chat application 700 that extends the keypad of the chat application on to the slave device 202a. The method allows User 1 to type the text and send the text to the User 2 by using the keypad 700a, which is displayed on the slave device 202a. As the User 1 types the text on the keypad 700a on the slave device 202a, the slave device 202a transmits the text to the master device 201 or the user action for further processing on the master device 201. The method allows the processing result to occur on the master device 201. Additionally, the method allows the user to disconnect the master device 201 and the slave device 202a by selecting a close button 401 on the slave device 202a or close button 402 on the master device 201.

Figure 8:
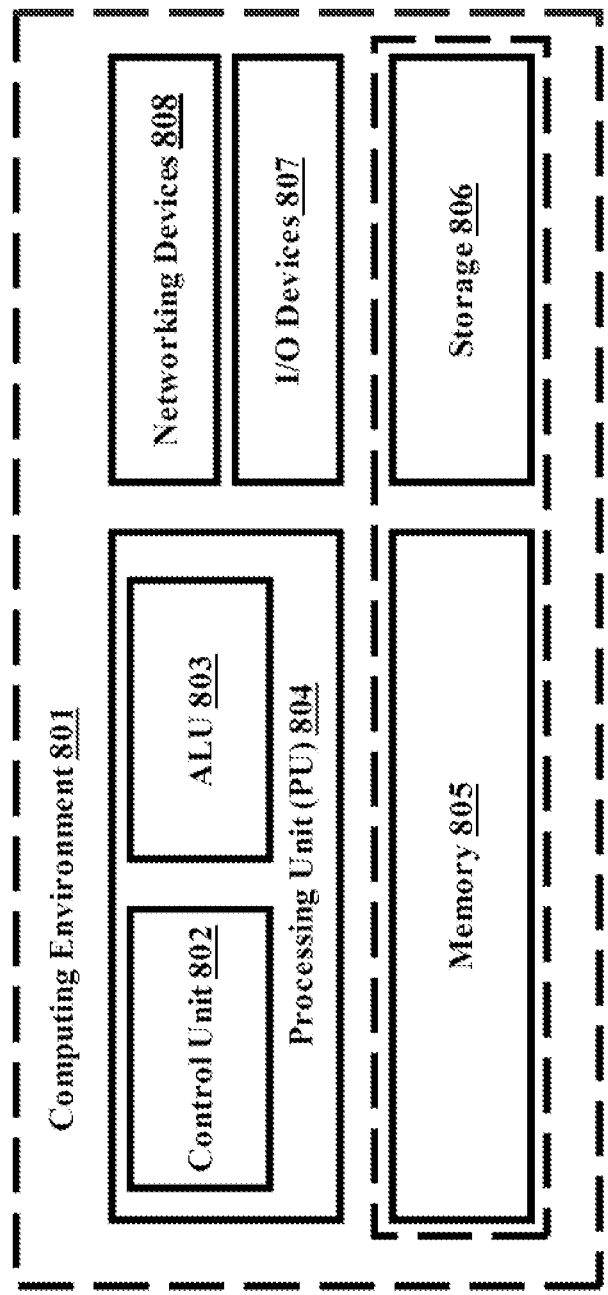
FIG. 8 illustrates a computing environment implementing a method to extend display content across multiple display devices over a network according to an embodiment of the present disclosure.

FIG. 8 illustrates a computing environment implementing a method to extend display content across multiple display devices over a network according to an embodiment of the present disclosure.

Referring to FIG. 8, the computing environment 801 comprises at least one processing unit 804 that is equipped with a control unit 802 and an Arithmetic Logic Unit (ALU) 803, a memory 805, a storage unit 806, a plurality of networking devices 808 and a plurality of Input Output (I/O) devices 807. The processing unit 804 is responsible for processing the instructions of the algorithm. The processing unit 804 receives commands from the control unit in order to perform its processing. Any logical and arithmetic operations involved in the execution of the instructions are computed with the help of the ALU 803.

The overall computing environment 801 can be composed of multiple homogeneous and/or heterogeneous cores, multiple CPUs of different kinds, special media and other accelerators. The processing unit 804 is responsible for processing the instructions of the algorithm. The plurality of processing units 804 may be located on a single chip or over multiple chips.

The algorithm comprising instructions and codes needed for the implementation are stored in either the memory unit 805 or the storage 806 or both. At the time of execution, the instructions may be fetched from the corresponding memory 805 and/or storage 806, and executed by the processing unit 804.

In case of any hardware implementations various networking devices 808 or external I/O devices 807 may be connected to the computing environment to support the implementation through the networking unit and the I/O device unit.

The various embodiments disclosed herein can be implemented through at least one software program running on at least one hardware device and performing network management functions to control the elements. The elements shown in FIGS. 1, 2, 4, 5, 6, 7 and 8 include blocks which can be at least one of a hardware device, or a combination of hardware device and software module.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method in an electronic device, comprising:
displaying, via a display of the electronic device, an image within a display area;
in response to detecting an input, identifying first fingerprint information from the input;
generating, through a communication module of the electronic device, a connection between the electronic device and another electronic device, wherein the another electronic device is identified based on the first fingerprint information and second fingerprint information, and wherein the second fingerprint information is identified by the another electronic device;
in response to the generating, displaying, via the display, a portion of the image within the display area; and
transmitting, to the another electronic device, information regarding a remaining portion of the image to display the remaining portion of the image in the another electronic device.

2. The method of claim 1,
wherein the first fingerprint information and the second fingerprint information comprise polarities of hands of a user, and
wherein the polarities represent left or right.

3. The method of claim 1, further comprising:
determining a location association between the electronic device and the another electronic device based on at least one of the first fingerprint information or the second fingerprint information.

4. The method of claim 3,
wherein the portion of the image is determined as a left portion of the image based on the location association, and
wherein the remaining of the image is determined as a right portion of the image based on the location association.

5. The method of claim 3,
wherein the portion of the image is determined as a right portion of the image based on the location association, and
wherein the remaining of the image is determined as a left portion of the image based on the location association.

6. The method of claim 1, further comprising:
broadcasting the first fingerprint information representing a first key; and
generating the connection based on the first key corresponding to a second key which is represented by the second fingerprint information.

7. The method of claim 1, further comprising:
receiving, from the another device, information regarding another input received by the another electronic device; and
performing, by the electronic device, an operation which corresponds to the another input.

8. The method of claim 1, further comprising:
detecting another input for terminating the connection between the electronic device and the another electronic device; and
in response to the detecting the another input, displaying, via the display, the image within the display area.

9. The method of claim 1, further comprising:
detecting another input for terminating the connection between the electronic device and the another electronic device; and
in response to the detecting the another input, terminating to display, via the display, the image within the display area.

10. The method of claim 1, wherein the input comprises at least one of swiping, tapping, touching, or dragging.

11. An electronic device comprising:
a memory storing instructions;
a display;
a communication module; and
at least one processor, coupled to the display and the communication module, configured to execute the stored instructions to:
   display, via the display, an image within a display area,
   in response to detecting an input, identify first fingerprint information from the input,
   generate, through the communication module, a connection between the electronic device and another electronic device, wherein the another electronic device is identified based on the first fingerprint information and second fingerprint information, and wherein the second fingerprint information is identified by the another electronic device,
   in response to the generating, display, via the display, a portion of the image within the display area; and
   transmit, to the another electronic device, information regarding a remaining portion of the image to display the remaining portion of the image in the another electronic device.

12. The electronic device of claim 11,
wherein the first fingerprint information and the second fingerprint information comprise polarities of hands of a user, and
wherein the polarities represent left or right.

13. The electronic device of claim 11, wherein the at least one processor is further configured to execute the stored instructions to:
   determine a location association between the electronic device and the another electronic device based on at least one of the first fingerprint information or the second fingerprint information.

14. The electronic device of claim 13,
wherein the portion of the image is determined as a left portion of the image based on the location association, and
wherein the remaining portion of the image is determined as a right portion of the image based on the location association.

15. The electronic device of claim 13,
wherein the portion of the image is determined as a right portion of the image based on the location association, and
wherein the remaining portion of the image is determined as a left portion of the image based on the location association.

16. The electronic device of claim 11, wherein the at least one processor is further configured to execute the stored instructions to:
   broadcast the first fingerprint information representing a first key; and
   generate the connection based on the first key corresponding to a second key which is represented by the second fingerprint information.

17. The electronic device of claim 11, wherein the at least one processor is further configured to execute the stored instructions to:
   receive, from the another device, information regarding another input received by the another electronic device; and
   perform, by the electronic device, an operation which corresponds to the another input.

18. The electronic device of claim 11, wherein the at least one processor is further configured to execute the stored instructions to:
   detect another input for terminating the connection between the electronic device and the another electronic device; and
   in response to the detecting the another input, display, via the display, the image within the display area.

19. The electronic device of claim 11, wherein the at least one processor is further configured to execute the stored instructions to:
   detect another input for terminating the connection between the electronic device and the another electronic device; and
   in response to the detecting the another input, terminate to display, via the display, the image within the display area.

20. An electronic device comprising:
a memory storing instructions;
a display;
a communication module; and
at least one processor, coupled to the display and the communication module, configured to execute the stored instructions to:
   in response to detecting an input, identify second fingerprint information from the input,
   determine that the second fingerprint information corresponds to first fingerprint information broadcasted by another electronic device,
   in response to the determining, receive, from the another electronic device, information regarding a portion of an image, the image being displayed in the another electronic device, and
   display, via the display, the portion of the image based on the received information,
   wherein a remaining portion of the image is displayed in the another electronic device.

* * * * *